March 13, 1962 E. O. JOHNSON 3,025,416

LOW TEMPERATURE DEVICES AND CIRCUITS

Filed May 15, 1958 2 Sheets-Sheet 1

INVENTOR.
EDWARD O. JOHNSON
BY J. L. Whittaker
ATTORNEY

INVENTOR.
EDWARD O. JOHNSON
BY J. C. Whittaker
ATTORNEY

United States Patent Office 3,025,416

Patented Mar. 13, 1962

3,025,416

LOW TEMPERATURE DEVICES AND CIRCUITS

Edward O. Johnson, Princeton, N.J., assignor to Radio Corporation of America, a corporation of Delaware Filed May 15, 1958, Ser. No. 735,626
18 Claims. (Cl. 307—88.5)

The present invention relates to improved devices and circuits which depend for their operation on the sudden change in resistivity of certain types of conductors and semiconductors under predetermined conditions of applied field and ambient temperature.

A new class of devices was recently discovered which depend for their operation on the "breakdown" characteristics of certain types of semiconductors under predetermined conditions of applied electric field and ambient temperature. In brief, these semiconductors have a resistivity which varies inversely with temperature in a given low temperature region, say 50° Kelvin to 0° Kelvin. The resistivity may vary, for example, from a value of 1 ohm centimeter or so to a value of $10^6$ ohm centimeters or higher. It has been found that if, after the semiconductor has reached a high value of resistivity, an electric field is applied to the semiconductor of greater than a given magnitude, the resistivity of the semiconductor sharply changes from its high value to a value of on the order of 10 ohm centimeters or so, depending upon the material and the ambient temperature. This phenomenon may be made use of in amplifiers, switches, oscillators, etc.

It is believed that the breakdown phenomenon described above can be explained in terms of impact ionization. It is believed that at the low temperatures involved, the electric charge carriers present in the semiconductors obtain relatively high "mobilities." A relatively small electric field of the order of a few volts per centimeter can then impart enough energy to the charge carriers, i.e. electrons or holes present in excess, to cause impact ionization of the neutral donor or acceptor impurities. Accordingly, a semiconductor body of the type described above to which a single pair of terminals are connected has come to be known as an impact ionization diode.

The magnitude of the electric field required to produce the breakdown phenomenon in a semiconductor may be influenced by an applied magnetic field. In general, as the applied magnetic field is increased, the value of the electric field necessary to produce breakdown is also increased. A device which is magnetic field controlled and consists of an impact ionization diode about which a coil is wound has been termed a "cryistor."

Some types of metals and metallic compounds also exhibit peculiar characteristics at low temperatures. These are known as superconductors. When placed in a temperature which is sufficiently low, on the order of liquid helium temperatures for some metals, the resistance of the superconductor suddenly reduces to 0 ohms. Accordingly, superconductors have found important use in switching applications as, for example, in computers. Another property of the superconductor is that it acts as a shield for a magnetic field when in its superconducting condition. The superconductivity may be quenched by applying a current of greater than a given value to the superconductor.

An object of the present invention is to provide a new class of devices which depend for their operation both on the superconducting phenomenon and the impact ionization phenomenon.

Another object of the invention is to provide an improved switch which is capable of high speed operation.

Another object of the invention is to provide an improved device in which a small amount of input power is capable of controlling a much larger amount of output power.

Still another object of the invention is to provide new and improved computer circuit elements such as "and" circuits, "or" circuits and the like.

The present invention uses the advantageous properties both of the superconductor and the semiconductors described above. In one form of the invention a superconducting film is formed on an impact ionization diode. When the resultant body is maintained at a temperature sufficiently low to maintain the film in its superconducting state, the latter acts as a perfect shield to a magnetic field. At this temperature, the diode can be driven to breakdown upon the application of a small electric field.

In operation, the impact ionization diode with superconducting film is placed in a low temperature environment, an electric field is applied to the diode, and a magnetic field is applied to the film. The film is in its superconducting state; the diode is at breakdown and can conduct a relatively high current. A small signal current applied to the film quenches its superconductivity, whereby the magnetic field penetrates the film and "quenches" the impact ionization. Since the film impedance is 0 ohms initially, the input power required is very small. The amount of power switched (the current conducted by the diode multiplied by the diode load resistance), on the other hand, is relatively large.

An important advantage of this arrangement is that it is capable of much higher frequency operation than the cryistor or the "cryotron" (a well known superconducting switch element). In the two latter components, the coil inductance limits the speed of response, whereas here the only limitation is the speed at which superconductivity can be quenched.

The structure described above, with modification, is useful in a large class of applications. For example, a multiple switching arrangement includes a plurality of impact ionization diodes covered by a single superconducting film. Quenching the superconductivity switches all diodes simultaneously. One embodiment of an "and" circuit according to the invention includes an impact ionization diode with two superconducting films surrounding the diode, the films being insulated from one another. Here, in order to switch the diode, it is necessary to quench the superconductivity of both films. An embodiment of the invention useful as an "or" circuit requires two magnetic fields and a film between each field and the impact ionization diode. Here, quenching the superconductivity of either film switches the diode. Many other arrangements are possible.

The invention will be described in greater detail by reference to the following description taken in connection with the accompanying drawing in which.

Figure 6A:
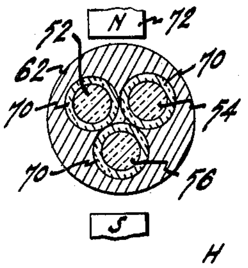
Figure 6B:
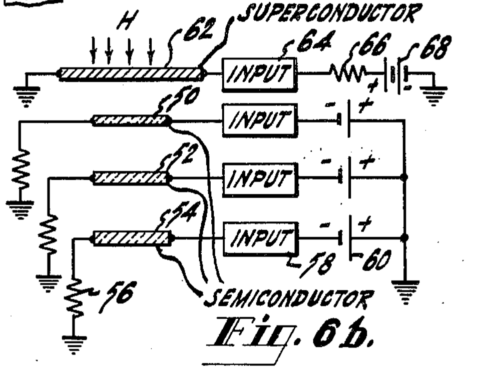
Figure 7A:
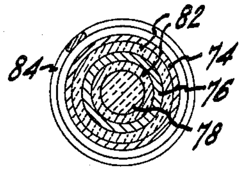
Figure 7B:
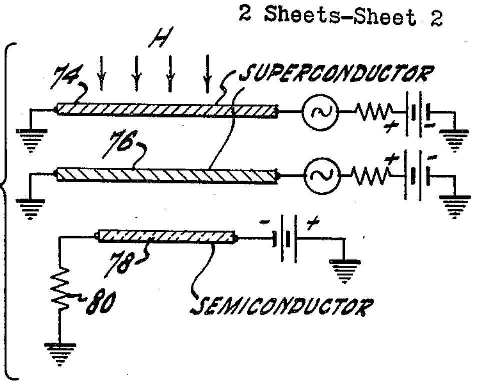
Figure 8A:
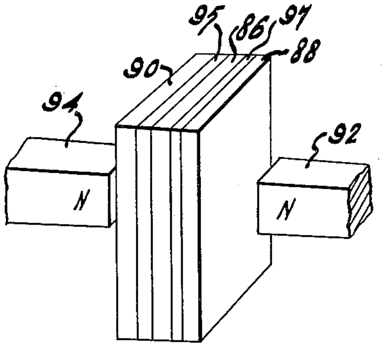
Figure 8B:
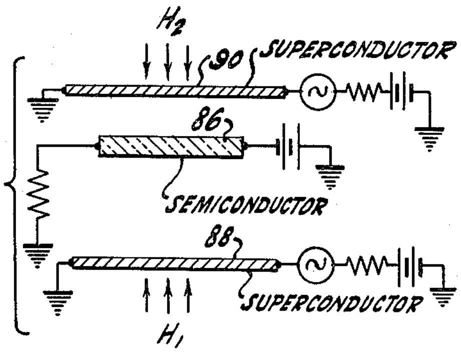
Figure 8C:
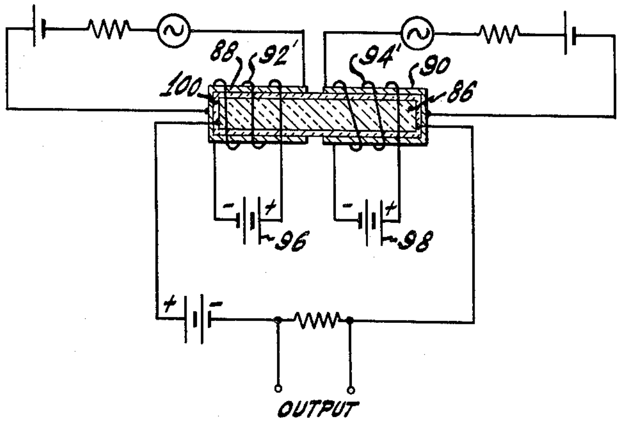

FIGS. 6*a* and 6*b* are drawings of a multiple switching arrangement according to the invention;

FIGS. 7*a* and 7*b* are drawings of an "and" circuit according to the invention; and FIGS. 8*a*, 8*b* and 8*c* are drawings of "or" circuits according to the invention.

Throughout the figures similar reference numerals are applied to similar elements.

Figure 1:
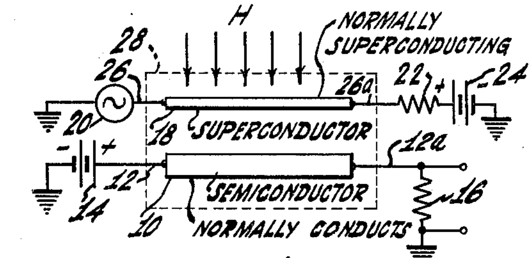
FIG. 1 is a schematic circuit diagram of one form of the present invention.

Referring to FIG. 1, an impact ionization diode 10 is formed of a material such as N or P-type germanium, silicon alloys of germanium, P-type indium antimonide, or N-type indium phosphide, as examples. A pair of terminals 12, 12*a* are secured to the body by conventional means, as described in the applications above. The source applying a voltage across the impact ionization diode is shown schematically as a battery 14. The load across which the output voltage is taken is shown schematically as a resistor 16.

The semiconductor is covered with a thin film of superconducting material shown schematically at 18. The temperature at which the superconductor is maintained must, of course, correspond to a temperature at which impact ionization is possible in the particular semiconductor. Suitable superconducting materials, for example, include lead, tin, niobium, tantalum, niobium nitride, niobium carbide and many others. An A.C. signal source 20, a small resistor 22, and biasing battery 24 are connected in series with the superconducting film. The terminals 26, 26*a* are secured to the superconducting film by conventional means.

Some specific values of circuit components and parameters for the arrangements of FIG. 1 and the other figures are as follows: Source 24 may produce a direct voltage of a few volts. Resistor 22 may be on the order of 1,000 ohms or so; the magnetic field H may be on the order of 1,000 gauss; source 14 may provide 10 volts; the impact ionization diode 10 may be a half centimeter long or less and a few millimeters in cross-section; the load 16 may be about 100 ohms; the insulating layer between the superconductor and semiconductor (shown in FIG. 2) should be a few mils thick and may be formed of an oxide or plastic or any other suitable insulating material; the superconductor layer 18 may be on the order of 0.1 to 1.0 mils thick and may be formed on the insulating layer by evaporating techniques, for example. These values are, of course, only illustrative and are not to be taken as limiting.

The superconducting film and the impact ionization diode are both located in a low temperature environment as indicated schematically by the dashed box 28. The box may represent a liquid helium cryostat or other means for maintaining the superconductor and impact ionization diode at a low temperature. Such cryostats are commercially available as are double Dewar flasks which use liquid nitrogen in the outer Dewar and liquid helium in the inner Dewar and lose less than 1% of liquid helium a day. A general discussion of low temperature equipment may be found in an article entitled "Low Temperature Electronics" in the Proceedings of the IRE, volume 42, pages 408–412, February 1954, and in other publications.

In operations, the ambient temperature is maintained sufficiently low for superconductivity to occur. At this temperature, the semiconductor is in its breakdown condition in the presence of an applied electric field of greater than a given low value. A magnetic field H is applied to the film. The magnitude of the magnetic field is such that the impact ionization diode, if immersed therein, would be driven out of its breakdown condition.

In one mode of operation, the superconductor is normally superconducting. The direct voltage applied to the impact ionization diode by source 14 is sufficient to cause breakdown, and a relatively large amount of current flows through the load 16. When source 20 applies a small current pulse to the film, the superconductivity is quenched and the magnetic field passes through the film. The strength of the magnetic field is sufficient to drive the impact ionization diode to cut off (its prebreakdown or high resistivity state) and the load current is sharply reduced to substantially zero.

Figure 5:
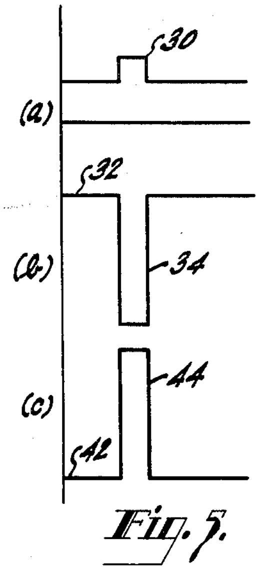
FIG. 5 shows waveforms present in the circuits of FIGS. 1–4.

The above mode of operation is illustrated in FIGS. 5*a* and *b*. The pulse 30 is the one applied to the superconductor. It may be of very low magnitude, on the order of 1 milliampere, or less, for example. Note that the circuit impedance is very low so that the pulse power required to quench the superconductivity is very low. When the film is superconducting, the voltage across the load is relatively high as indicated at 32 in FIG. 5*b*. This voltage may be on the order of 10 volts, for example. When the pulse 30 is applied to the film, however, the impact ionization diode impedance sharply increases so that the voltage across load resistor 16 sharply decreases as indicated at 34 in FIG. 5.

Figure 2:
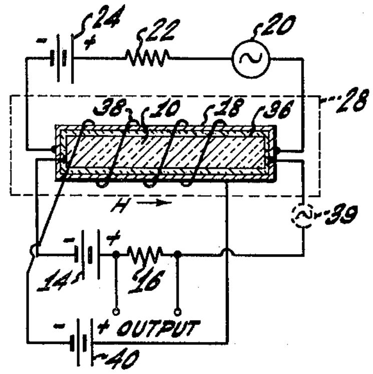
FIG. 2 is a more realistic representation of a device and circuit such as that shown in FIG. 1 with the device shown in cross-section.

FIG. 2 illustrates a practical form which the circuit of FIG. 1 may take. The impact ionization diode 10 is covered with a layer of insulating material 36 and the superconductor 18 appears as a thin film over the insulating material. The means for producing the magnetic field H is shown as a coil 38 connected to a source of D.C. voltage 40. Preferably, the coil is also formed of a superconductor such as niobium so that only a small amount of power is required to produce the magnetic field. The magnetic field generated by coil 38 is in the direction indicated by arrow H. However, if desired, the magnetic field may be applied in the direction shown in FIG. 1. The remaining components of the circuit are exactly the same as those shown in FIG. 1 and similar reference numerals have been applied.

The circuit of FIG. 2 can, with minor modification, be an "or" circuit. The modification is the addition of a second signal or pulse source 39 in series with the impact ionization diode as indicated schematically by the dashed symbol.

In operation, the diode normally conducts. However, if a pulse is applied to the diode in a direction opposite to the direct voltage applied by battery 14, the diode can be driven to cut off. A pulse as shown in FIG. 5*b* will result. The same thing will happen if a pulse is applied to the film in a sense to quench the superconductivity. Thus, either one of two input signals produces an output pulse.

The modified embodiment can also operate as an "and" circuit. Here, the direct voltage applied to the diode from source 14 is insufficient to cause impact ionization. The pulse from source 39 is in a sense to add to the direct voltage. Also, the direct voltage applied to the film quenches its superconductivity and the pulse from source 20 opposes the direct voltage.

In operation, normally no or substantially no current flows through the impact ionization diode for two reasons. First, it is immersed in a magnetic field and second, the electric field across it is too low to produce impact ionization. The pulse applied by source 20 to the film makes the film superconductive and the magnetic field is shielded from the diode. The pulse applied by source 39 causes impact ionization (in the absence of the magnetic field). Therefore, when both pulses are applied simultaneously, the pulse shown in FIG. 5*c* is produced at load 16. One input pulse, however, produces no output.

In the figures which follow, the dashed block 28 has been omitted for the sake of drawing simplicity. It is to be understood, however, that the superconductor-semiconductor device must, in all cases, be placed in low temperature environment, that is, a temperature sufficiently low to place the superconductor in its superconducting condition.

Figure 3:
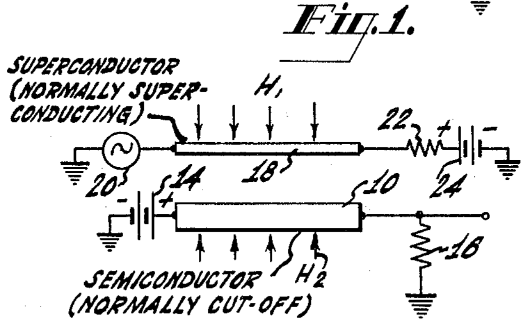
FIGS. 3 and 4 are schematic drawings of another form of the present invention.

The embodiment of FIG. 3 includes means for producing two magnetic fields $H_1$ and $H_2$. The magnetic field $H_2$ is sufficient to maintain the semiconductor in its high resistivity state. The magnetic field $H_1$ opposes the magnetic field $H_2$ and is of sufficient magnitude to reduce the resultant magnetic field applied to the semiconductor to a value sufficiently low that the semiconductor is at its breakdown condition.

In operation, the film 18 is normally in its superconducting condition, whereby the magnetic field $H_1$ cannot penetrate the superconductor. The semiconductor is in its high resistivity state in view of the high magnetic field $H_2$ and therefore does not conduct any appreciable amount of current. The voltage appearing across the load 16 is substantially 0 as indicated at 42 in FIG. 5c. When a small current pulse is applied to the film 18, the superconductivity is quenched and the magnetic field $H_1$ passes through the film. The resultant magnetic field $(H_2—H_1)$ applied to the semiconductor is too low to prevent breakdown from occurring. Accordingly, a relatively large amount of current passes through impact ionization diode, and a pulse 44 of the polarity indicated appears across the load, as shown in FIG. 5c. This embodiment of the invention is advantageous in that the impact ionization diode is normally cut off, whereby the power dissipation between pulses is substantially 0. If desired, the battery 14 may be omitted, a pulse from the same source applied simultaneously to the impact ionization diode 10 and the film 18.

Figure 4:
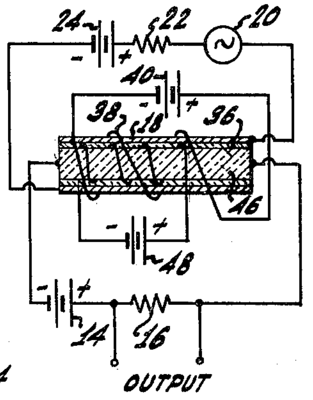

A practical form which the circuit of FIG. 3 may take is shown in FIG. 4. The magnetic field $H_2$, which is continuously applied to the impact ionization diode is produced by a coil 46 formed of insulated wire which is wound directly on the diode. The coil is preferably made of a superconductor and receives its current from a direct current source shown as battery 48. The coil and the superconductor may be covered by an insulating material 36. A thin superconducting film 18 is the final layer of the device. It is preferably formed with open ends to prevent the magnetic field generated by coil 46 from affecting the film superconductivity. The field would otherwise tend to concentrate at the ends of the film. Wound on the superconductor is a second coil of insulated wire 38 which produces a magnetic field $H_1$ which is 180° out-of-phase with the magnetic field $H_2$ produced by coil 46.

A multiple switching circuit is shown in FIG. 6b. For purposes of illustration, three impact ionization diodes 50, 52 and 54 are shown, however, more or fewer than this number may be used. Each diode has associated with it a load resistor 56, an input circuit 58 and a battery 60. For the sake of drawing simplicity, reference numerals are applied to only one diode circuit. The input circuit may, for example, be a means for producing a pulse of low amplitude which, when added to the bias voltage produced by D.C. source 60, produces an electric field across the semiconductor which is sufficient to cause breakdown in the absence of a magnetic field applied to the semiconductor. A superconducting film 62 covers the three impact ionization diodes. In series with the superconductor 62 are an input circuit 64, a resistor 66 and a current source 68. The input circuit may be one for producing a small amplitude current pulse which, when added to the direct current supplied by source 66, is sufficient to quench the superconductivity of film 62. A magnetic field H is then applied to the entire device.

In operation, film 62 is normally in its superconducting state so that the magnetic field H is shielded from the impact ionization diodes 50, 52 and 54. The diodes accordingly, normally act as closed switches, that is, they are normally in condition to conduct substantial amounts of current. When, however, a small current pulse is applied to the superconductor 62, the superconductivity is quenched, the magnetic field penetrates the superconducting film and passes to the three impact ionization diodes and the latter are driven to their high resistivity states. Accordingly, the small pulse applied to the superconducting film 62 simultaneously opens the three diode switches.

A practical form of this circuit is shown in FIG. 6a. Each diode is coated with an insulating film 70, then the group of three diodes are covered with a thin superconducting film 62. The means for applying the magnetic field may consist of a permanent magnet, the pole pieces 72 of which are shown. As an alternative arrangement, the magnetic field may be produced by a coil wound around the superconducting film 62. If the coil is wound about the long axis of the superconductor-semiconductor structure, the magnetic field H will be at 90° to the field H shown in FIG. 6b, however, a device of this type is equally operative.

A second "and" circuit according to the invention is shown in FIG. 7b. Here, two superconducting films 74, 76 and one impact ionization diode 78 are required. In operation, the normal currents supplied to the superconductor 74, 76 is too low to quench the superconductivity so that the magnetic field H is normally shielded from the impact ionization diode 78. The electric field across the impact ionization diode 78 is sufficient to produce breakdown so that the current across the load resistor 80 is normally relatively high. If two pulses are then applied simultaneously to films 74, 76, the superconductivity in both films is quenched, the magnetic field H is applied through the films to the impact ionization diode 78 and the latter is effectively cut off. If, however, only a single pulse is applied to a film, the other film still is superconducting and it continues to act as a shield. Accordingly, a single input pulse does not produce an output pulse across load 80.

A practical form of the device of FIG. 7b is shown in cross-section in FIG. 7a. Insulating layers 82 appear between the two superconductor layers 74 and 76 and between the superconductor layer 76 and the impact ionization diode 78. The magnetic field is produced by a coil 84 wound about the superconductor-semiconductor device and a D.C. source (not shown) connected to the coil.

Another form of "or" circuit according to the invention is shown in FIG. 8b. Two magnetic fields $H_1$ and $H_2$ are required. Field $H_1$ is normally prevented from reaching the impact ionization diode 86 by a superconducting film 88 and field $H_2$ is prevented from reaching the impact ionization diode 86 by a superconducting film 90. When the superconductivity of either film 88 or 90 is quenched, one of the magnetic fields reaches the impact ionization diode 86. Impact ionization diode 86 is normally in its breakdown state. Either magnetic field is of sufficient strength to drive the diode to cut off. If the fields are in opposite directions, as shown, and of the same or close to the same magnitude, the simultaneous application of pulses to the two films will produce no output pulse, as the two magnetic fields will cancel at the diode. On the other hand, if the films are of a magnitude such that $H_1—H_2$ produces a resultant field of sufficient strength to cut off the diode, or if $H_1$ and $H_2$ are in the same direction, then the simultaneous application of two pulses to the two films will produce an output pulse. Both types of "or" circuits have useful applications in computers.

A practical circuit of the type shown in FIG. 8b is illustrated in greater detail in FIG. 8a. The magnetic fields $H_1$ and $H_2$ are produced by permanent magnets 92 and 94. The impact ionization diode may be in the form of a flat member, as shown, or may be of other shape. The films 88 and 90 are also flat and are insulated from the diode by insulating layers 95 and 97. The circuit parameters are such that films 88 and 90 are normally superconducting. When either superconductor is quenched, a magnetic field will reach the impact ionization diode and drive it to cut off. When both superconductors are quenched, no output is produced. If one of the magnets is reversed however, so that it has a south pole adjacent its film and the other a north pole adjacent its film, a different type of "or" circuit results. This one produces an output pulse in response to one input pulse or two input pulses.

A third form of "or" circuit is shown in FIG. 8c. The diode 86a is covered with an insulating layer 100. The superconductor film consists of two spaced sections, each covering approximately one half of the diode. The magnetic fields $H_1$ and $H_2$ are produced by two coils 92′ and 94′, wound on the two film sections, respectively. The operation of this embodiment is similar to one mode of operation of the embodiment of FIG. 8*a*. Here, there is an output pulse in response to a pulse applied to either film or pulses simultaneously applied to both films.

What is claimed is:

1. A device comprising an impact ionization diode; and a superconducting film enclosing said diode.

2. A device comprising an impact ionization diode; a superconducting film on said diode and insulated therefrom; and a coil wound over the film for producing a magnetic field.

3. A device comprising an impact ionization diode, a layer of insulating material on said diode, a superconducting film over said layer of insulating material; a second insulating layer over said superconducting film; and a second superconducting film over said second insulating layer.

4. A body formed of a semiconductor material having a resistivity which varies inversely with temperature in a given temperature range but which sharply decreases in the presence of an electric field of greater than a given value when the body is below a given temperature, and in which the value of electric field at which the sharp decrease in resistivity occurs may be influenced by an applied magnetic field; a pair of terminals on said body to which a voltage may be applied for producing an electric field through the body; a film on said body formed of a superconducting material; and means for applying a current to said film.

5. A body formed of a semiconductor material having a resistivity which varies inversely with temperature in a given temperature range but which sharply decreases in the presence of an electric field of greater than a given value when the body is below a given temperature, and in which the value of electric field at which the sharp decrease in resistivity occurs may be influenced by an applied magnetic field; a pair of terminals on said body to which a voltage may be applied for producing an electric field through the body; a film on said body formed of a superconducting material; and means for applying a magnetic field to said film, whereby when the film is in its superconducting state, it shields the body from said magnetic field.

6. In the arrangement as set forth in claim 5, said means for applying a magnetic field to the film comprising a coil wound about the film.

7. In combination, a plurality of impact ionization diodes which are insulated from one another; a film of superconducting material covering said plurality of insulated impact ionization diodes; means for applying a magnetic field to the film of insufficient intensity to make the film normal when it is in its superconducting state; and means for applying a current to the film.

8. An "and" circuit comprising an impact ionization diode; and a pair of superconducting films which are insulated from one another and the diode surrounding the diode.

9. An "and" circuit as set forth in claim 8, further including a coil wound about the outermost superconducting film.

10. A switch comprising an insulated impact ionization diode; a superconductor film on the diode; means for maintaining the diode and its film at a temperature sufficiently low for the film to become superconducting; means for applying a magnetic field to the superconductor film; and means for quenching the superconductivity of the film.

11. A switch comprising an insulated impact ionization diode; a superconductor film on the diode; means for maintaining the diode and its film at a temperature sufficiently low for the film to become superconducting; means for applying a magnetic field to the film comprising a coil wound on the film; and means for applying a current to the film for quenching the superconductivity thereof.

12. A switch comprising an insulated impact ionization diode; a coil wound on the diode for producing a magnetic field; a superconducting film covering the diode and coil; means for maintaining the diode and its film at a temperature sufficiently low for the film to become superconducting; a coil wound on the film for producing a magnetic field, said magnetic field being opposed to the one produced by the coil wound on the diode; and means for applying a current pulse to the film for quenching the superconductivity thereof.

13. In combination, an insulated impact ionization diode; a superconducting film on the insulated diode; means for applying a magnetic field to the film; and means for applying a current pulse to the film of sufficient magnitude to quench its superconductivity.

14. An "or" circuit comprising, in combination, an insulated impact ionization diode; a superconductor film on the diode; means for maintaining the diode and its film at a temperature sufficiently low for the film to become superconducting; means for applying a direct current to the film of sufficient magnitude to quench its superconductivity; means for applying a current pulse to the film in a sense opposite to that of the direct current applied to the film and of sufficient magnitude to permit the film to become superconducting; and means for applying a pulse to the diode of sufficient amplitude to produce breakdown in the diode.

15. An "or" circuit comprising an insulated impact ionization diode; means for producing two magnetic fields either one of which is of sufficient magnitude to prevent breakdown of the diode at a given applied electric field to the diode; a superconducting shield located between each magnetic field producing means and the diode for shielding the diode from both fields when each shield is superconducting; means for applying an electric field of said given magnitude to said diode; and a pair of input circuits one for each superconducting shield, to which current pulses may be applied for quenching the superconductivity of each shield.

16. In combination, a body formed of a material the resistivity of which sharply changes in the presence of an electric field of greater than a given value when the body is below a given temperature, and in which the value of electric field at which the sharp decrease in resistivity occurs may be influenced by an applied magnetic field; a pair of terminals on said body to which a voltage may be applied for producing an electric field through the body; an insulating layer on the body; a film on the insulating layer formed of a superconducting material; and means for applying a magnetic field to the film, whereby when the film is in its superconducting state, it shields the semiconductor body from said magnetic field.

17. In combination, a body formed of material the resistivity of which sharply changes in response to an applied magnetic field when at a given low temperature; a film surrounding the body formed of a superconducting material; means for applying a magnetic field to the film whereby when the film is in its superconducting state, it shields the semiconductor body from said magnetic field; and terminals on said film to which a current may be applied.

18. In combination, a body formed of a material the resistivity of which may be influenced by an applied magnetic field when the body is at a given low temperature; a pair of terminals on the body to which a signal source and load may be connected; a film formed of a superconducting material covering the body and insulated therefrom; and means for applying a magnetic field to the film, whereby when the film is in its superconducting state, it shields the body from the magnetic field, and when it is not the field penetrates the film and affects the resistivity of the body.

(References on following page)

References Cited in the file of this patent

UNITED STATES PATENTS

| | | |
|---|---|---|
| 1,919,053 | Brinton | July 18, 1933 |
| 2,666,884 | Ericsson et al. | June 19, 1954 |
| 2,736,858 | Welker | Feb. 28, 1956 |
| 2,752,434 | Dunlap | June 26, 1956 |
| 2,773,250 | Aigrain | Dec. 4, 1956 |
| 2,790,088 | Shive | Apr. 23, 1957 |
| 2,900,531 | Wallmark | Aug. 18, 1959 |

| | | |
|---|---|---|
| 2,938,160 | Steele | May 24, 1960 |
| 2,944,211 | Richards | July 5, 1960 |

OTHER REFERENCES

Article, "An Analysis of the Operation of a Persistent-Supercurrent Memory Cell," by Garvin, IBM Journal, October 1957.

Article, "Trapped-flux Superconducting Memory," by Crowe, IBM Journal, October 1957.